United States Patent
Takahashi et al.

(10) Patent No.: US 11,306,397 B2
(45) Date of Patent: Apr. 19, 2022

(54) AQUEOUS SOLUTION FOR METAL SURFACE TREATMENT, TREATMENT METHOD FOR METAL SURFACE, AND JOINED BODY

(71) Applicant: Kobe Steel, Ltd., Kobe (JP)

(72) Inventors: Yusuke Takahashi, Hyogo (JP); Satoru Takada, Hyogo (JP)

(73) Assignee: Kobe Steel, Ltd., Kobe (JP)

( * ) Notice: Subject to any disclaimer, the term of this patent is extended or adjusted under 35 U.S.C. 154(b) by 517 days.

(21) Appl. No.: 16/099,841

(22) PCT Filed: May 10, 2017

(86) PCT No.: PCT/JP2017/017618
§ 371 (c)(1),
(2) Date: Nov. 8, 2018

(87) PCT Pub. No.: WO2017/195803
PCT Pub. Date: Nov. 16, 2017

(65) Prior Publication Data
US 2019/0177854 A1   Jun. 13, 2019

(30) Foreign Application Priority Data

May 10, 2016  (JP) .............................. JP2016-094925

(51) Int. Cl.
| | | |
|---|---|---|
| *C23C 22/00* | (2006.01) | |
| *C23C 22/56* | (2006.01) | |
| *B32B 15/08* | (2006.01) | |
| *B32B 7/12* | (2006.01) | |
| *B32B 15/20* | (2006.01) | |

(52) U.S. Cl.
CPC .............. *C23C 22/56* (2013.01); *B32B 7/12* (2013.01); *B32B 15/08* (2013.01); *B32B 15/20* (2013.01); *C23C 22/00* (2013.01); *C23C 2222/20* (2013.01)

(58) Field of Classification Search
None
See application file for complete search history.

(56) References Cited

U.S. PATENT DOCUMENTS

| | | |
|---|---|---|
| 5,108,793 A | 4/1992 | Van Ooij et al. |
| 5,433,976 A | 7/1995 | Van Ooij et al. |
| 5,750,197 A | 5/1998 | Van Ooij et al. |
| 5,879,437 A | 3/1999 | Hartman |
| 6,132,808 A | 10/2000 | Brown et al. |
| 6,929,826 B1 | 8/2005 | Parkhill et al. |
| 2006/0233958 A1* | 10/2006 | Matsumura ............. C09D 5/08 427/402 |
| 2013/0295292 A1 | 11/2013 | Bukeikhanova et al. |
| 2014/0120739 A1 | 5/2014 | Phillips et al. |
| 2016/0145444 A1* | 5/2016 | Qiu ........................ C09J 183/04 428/447 |

FOREIGN PATENT DOCUMENTS

| | | | |
|---|---|---|---|
| CN | 101627668 A | | 1/2010 |
| CN | 105200416 A | * | 12/2015 |
| CN | 105200416 A | | 12/2015 |
| EP | 1 978 024 A1 | | 10/2008 |
| JP | 10-510307 A | | 10/1996 |
| JP | 9-510259 A | | 10/1997 |
| JP | 3289769 B2 | | 3/2002 |
| JP | 4376972 B2 | | 12/2009 |
| JP | 4589364 B2 | | 12/2010 |
| JP | 2014-502287 A | | 1/2014 |
| WO | WO 2008/122427 A2 | | 10/2008 |

OTHER PUBLICATIONS

CN-105200416-A, English translation (Year: 2015).*
Extended European Search Report dated Dec. 6, 2019 in Patent Application No. 17796163.8, 8 pages.

* cited by examiner

*Primary Examiner* — Stefanie J Cohen
(74) *Attorney, Agent, or Firm* — Oblon, McClelland, Maier & Neustadt, L.L.P.

(57) ABSTRACT

An aqueous solution for metal surface treatment includes an alkyl silicate or an oligomer thereof in a concentration of 0.005 mass % or more and less than 1 mass %, and an organic silane compound in a concentration of 0.005 mass % or more and less than 1 mass %. The aqueous solution has a pH of 2 or more and 7 or less.

20 Claims, 1 Drawing Sheet

AQUEOUS SOLUTION FOR METAL SURFACE TREATMENT, TREATMENT METHOD FOR METAL SURFACE, AND JOINED BODY

TECHNICAL FIELD

The present invention relates to an aqueous solution and method for metal surface treatment, as well as a bonded article prepared using a metal article treated with the aqueous solution for metal surface treatment.

BACKGROUND ART

For weight reduction of members or components for use in transportation equipment such as automobiles, ships, and aircraft, attention has been focused on development of techniques of bonding materials with each other, where the materials differ from each other typically in strength, raw materials, and/or mass. In particular, bonding through an adhesive resin (resin adhesive) does not cause corrosion of the materials by electrolytic corrosion and enables bonding of a wide variety of materials without corrosion, and has been actively investigated recently. However, when the resulting bonded article, when placed in a humid environment, undergoes corrosion-degradation at the metal surface due to moisture entering the interface between the metal and the adhesive resin and readily undergoes peeling (separation) at the interface between the metal and the adhesive resin from the corrosion and to maintain bond strength at certain level even in a humid environment.

Known examples of such bonding pretreatment for anticorrosion include surface treatments to provide better corrosion resistance and better paint adhesion of the metal surface.

For example, PTL 1 describes a technique of treating a metal such as aluminum with an aqueous composition containing a tetraalkyl silicate (such as tetraethyl orthosilicate) and a hydrous oxide sol (such as silica sol), to give higher initial adhesion and better long-term stability in adhesion, of the coating formed on the metal, where the coating layer is exemplified by an adhesive coating.

PTL 2 describes a technique of treating a metal substrate with a first treatment solution consisting essentially of at least one multifunctional silane containing at least two trisubstituted silyl groups; and then applying a second coating including a second treatment solution containing at least one organofuctional silane, to provide better corrosion resistance of the metal.

PTL 3 describes a technique of treating a metal substrate with a solution containing an aminosilane and a multi-silyl-functional silane to provide better corrosion resistance of the metal.

PTL 4 describes a technique of rinsing the surface of a galvanized steel sheet with an aqueous solution containing a silicate compound, and subsequently treating the steel sheet with silane coupling agent, so as to provide better corrosion resistance.

PTL 5 describes a technique of applying a solution onto a galvanized steel sheet (steel sheet plated with a zinc-based plating) and drying the coated solution, thereby forming a coating so as to provide better paint adhesion and better white rust resistance, where the solution contains a silicic acid ester, an aluminum inorganic salt, and a polyethylene glycol and further contains a silane coupling agent.

PTL 6 proposes a technique of treating the surface of a metal material (such as aluminum or an aluminum alloy) with an aqueous solution containing a water glass (such as sodium water glass) and a silane (such as aminosilane) to provide better paint adhesion.

PTL 7 describes a technique of treating a metal sheet with an alkaline solution containing an inorganic silicate, an organic functional silane, and a crosslinker containing two or more trialkoxysilyl groups, so as to provide better corrosion resistance and better paint adhesion.

CITATION LIST

Patent Literature

PTL 1: JP-A-H10-510307
PTL 2: Japanese Patent No. 4376972
PTL 3: Japanese Patent No. 4589364
PTL 4: U.S. Pat. No. 5,108,793
PTL 5: Japanese Patent No. 3289769
PTL 6: JP-A-2014-502287
PTL 7: JP-A-H09-510259

SUMMARY OF INVENTION

Technical Problem

However, the problem resulting from article obtained by the technique described in PTL 1 has a significantly lower bond strength on a long-term humid degradation test and it is not considered to have sufficient bond durability.

The technique described in PTL 2 and PTL 3 give silane coatings having insufficient bond durability and are also disadvantageous in practical utility in process, because these techniques require high-temperature drying or long-time treatment.

The techniques described in PTL 4 to PTL 7 are merely intended to contribute to anticorrosion of metal surface and to better paint adhesion. The formed coatings are therefore thick, but such thick coatings have low mechanical strength, are fragile with respect to tension and stress, and fail to offer high bond strength.

In addition, aluminum alloy materials after surface treatment is coated with an oil for better workability, and then shaped and subjected to bonding through an adhesive. In this process, if an oil, such as a lubricating oil, a working oil, or a press forming oil, is present between the surface treatment layer (surface treatment coating) and the adhesive, the adhesive is caused to have significantly lowers adhesion and to fail to give high bond strength. To eliminate or minimize this, demands have been made to develop an aluminum alloy material that resists deterioration in bond durability even when a machine oil such as a working oil or press forming oil is deposited on its surface.

In view of the above problems, an object of the present invention is to provide an aqueous solution and method for metal surface treatment, each of which enables production of a surface-treated metal article by a simplified process and can contributes to reduction in capital investment and production cost, where the surface-treated metal article resists deterioration in bond strength and offers excellent bond durability even when exposed to a hot and humid environment. The present invention has another object to provide a bonded article obtained using the metal article treated with the aqueous solution for metal surface treatment.

Solution to Problem

As a result of further investigation with ingenuity, the present inventors found that the objects can be achieved by an aqueous solution for metal surface treatment, which contains an alkyl silicate or an oligomer thereof and an organic silane compound in concentrations within specific ranges and has a pH controlled within a specific range. The present invention has been made on the basis of these findings.

That is, the present invention provides an aqueous solution for metal surface treatment, comprising: an alkyl silicate or an oligomer thereof in a concentration of 0.005 mass % or more and less than 1 mass %; and an organic silane compound in a concentration of 0.005 mass % or more and less than 1 mass %, wherein the aqueous solution has a pH of 2 or more and 7 or less.

In the aqueous solution for metal surface treatment, the alkyl silicate or oligomer thereof is preferably present in a concentration of 0.01 mass % or more and less than 0.5 mass %.

In the aqueous solution for metal surface treatment, the alkyl silicate or oligomer thereof is preferably present in a concentration of 0.02 mass % or more and less than 0.2 mass %.

It is preferred that the aqueous solution for metal surface treatment is substantially free of a particulate inorganic compound having a diameter of 1 nm or more.

In the aqueous solution for metal surface treatment, the organic silane compound is preferably present in a concentration of 0.01 mass % or more and less than 0.5 mass %.

In the aqueous solution for metal surface treatment, the organic silane compound is preferably present in a concentration of 0.02 mass % or more and less than 0.2 mass %.

In the aqueous solution for metal surface treatment, the pH of the aqueous solution is preferably 6 or less.

In the aqueous solution for metal surface treatment, the organic silane compound preferably comprises a silane compound containing a plurality of hydrolyzable trialkoxysilyl groups in a molecule, a hydrolyzed product of the silane compound, or a polymer derived from the silane compound.

It is preferred that the aqueous solution for metal surface treatment further comprises, as a stabilizer, at least one selected from the group consisting of an alcohol having 1 to 4 carbon atoms and a carboxylic acid having 1 to 4 carbon atoms.

In the aqueous solution for metal surface treatment, the organic silane compound preferably comprises a silane coupling agent containing a reactive functional group capable of chemically bonding with an organic resin component, a hydrolyzed product of the silane coupling agent, or a polymer derived from the silane coupling agent.

In addition, the present invention provides a method for treating a metal surface with the aqueous solution for metal surface treatment, the method comprising applying the aqueous solution onto a surface of a metal to form a surface treatment layer so that the surface treatment layer after drying is present in an amount of 0.5 mg/m$^2$ or more and 20 mg/m$^2$ or less.

In the method for treating a metal surface, the metal is preferably an aluminum alloy.

In addition, the present invention provides a bonded article comprising: metal articles treated with the aqueous solution for metal surface treatment; and an adhesive resin through which the metal articles bond with each other.

In addition, the present invention provides a bonded article comprising: a metal article treated with the aqueous solution for metal surface treatment; a resin molded article; and an adhesive resin through which the metal article and the resin molded article bond with each other.

Advantageous Effects of Invention

The aqueous solution for metal surface treatment and the method for treating a metal surface according to the present invention enable production of a surface-treated metal article through a simplified process, where the surface-treated metal article resists deterioration in bond strength and offers excellent bond durability even when exposed to a hot and humid environment. Thus, the aqueous solution for metal surface treatment and the method for treating a metal surface contribute to reduction in capital investment and production cost.

Figure 1A:
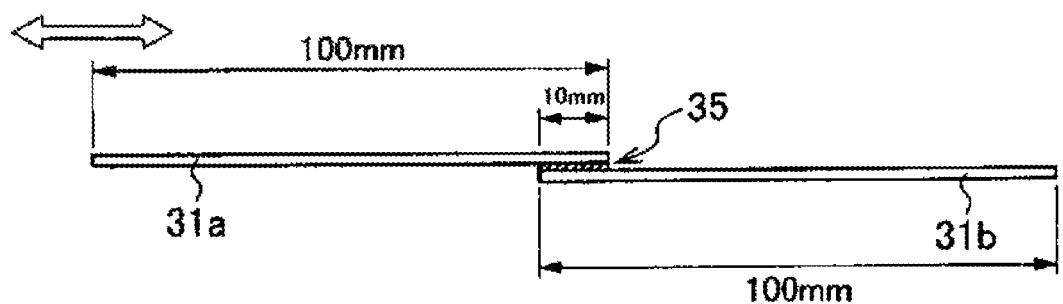
FIG. 1A is a side view of a bonded test sample and illustrates how to measure a cohesive failure rate.

DESCRIPTION OF EMBODIMENTS (Aqueous Solution for Metal Surface Treatment)

The aqueous solution for metal surface treatment (hereinafter also referred to as a surface treatment solution) according to the present invention is described below.

The aqueous solution for metal surface treatment according to the present invention contains: an alkyl silicate or an oligomer thereof in a concentration of 0.005 mass % or more and less than 1 mass %; and an organic silane compound in a concentration of 0.005 mass % or more and less than 1 mass %, wherein the aqueous solution for metal surface treatment has a pH of 2 or more and 7 or less. When the surface treatment solution according to the present invention is applied onto at least a part of a metal surface, the alkyl silicate or oligomer thereof is introduced into the metal surface to from a complex oxide layer of silicon with the metal element in the metal. In a subsequent drying step, a surface treatment layer containing the organic silane compound in which the organic silane compound chemically bonds with the complex oxide layer is formed. The surface-treated metal article obtained in this manner extremely excels not only in bonding property with the adhesive, but also in corrosion resistance, and resists deterioration in bond strength, and offers excellent bond durability even when exposed to a hot and humid environment. The aqueous solution for metal surface treatment according to the present invention enables a surface treatment with the alkyl silicate or oligomer thereof and a surface treatment with the organic silane compound in one step, and enables production of a surface-treated metal article through a simplified process, where the surface-treated metal article offers excellent bond durability. This contributes to reduction in capital investment and production cost.

The surface treatment solution according to the present invention has a pH of 2 or more and 7 or less. The surface treatment solution, if having a pH of more than 7, disadvantageously causes the alkyl silicate or oligomer thereof to tend to excessively polymerize and has lower storage stability. In addition, the alkyl silicate or oligomer thereof, if undergoing polymerization, forms a treatment layer having a larger thickness. Such a thick treatment layer may internally fracture when receiving stress, and fails to give high bond strength. In contrast, the surface treatment solution, if having a pH of less than 2, causes severe dissolution of the metal surface and a non-uniform treatment layer. Therefore, the surface treatment solution is difficult to exhibit stable bond property. Thus, the pH of the surface treatment solution is necessary to fall within the range of 2 or more and 7 or less. The pH of the surface treatment solution is preferably 3 or more, from the viewpoint of reactivity with the metal oxide layer. In addition, the pH of the surface treatment solution is preferably 6 or less, from the viewpoint of the stability of the alkyl silicate. The pH of the surface treatment solution can be appropriately adjusted by adding an acid such as hydrochloric acid, sulfuric acid, nitric acid, or acetic acid.

The surface treatment solution contains the alkyl silicate or an oligomer thereof in a concentration of 0.005 mass % or more and less than 1 mass %. The surface treatment solution, if containing the alkyl silicate or an oligomer thereof in a concentration of 1 mass % or more, forms a surface treatment layer that has an excessively large thickness and leads to lower strength. In contrast, the surface treatment solution, if containing the alkyl silicate or an oligomer thereof in a concentration less than 0.005 mass %, fails to sufficiently form a complex oxide layer of silicon with the metal element in the metal due to the excessively low concentration of the alkyl silicate or oligomer thereof, and fails to offer sufficient bond durability. The concentration of the alkyl silicate or oligomer thereof in the surface treatment solution is preferably 0.01 mass % or more, and more preferably 0.02 mass % or more. In addition, the concentration of the alkyl silicate or oligomer thereof in the surface treatment solution is preferably less than 0.5 mass %, and more preferably less than 0.2 mass %.

The surface treatment solution contains the organic silane compound in a concentration of 0.005 mass % or more and less than 1 mass %. The surface treatment solution, if containing the organic silane compound in a concentration of 1 mass % or more, forms a surface treatment layer that has an excessively large thickness and leads to lower strength. In addition, this surface treatment solution disadvantageously has lower stability. In contrast, the surface treatment solution, if containing the organic silane compound in a concentration less than 0.005 mass %, fails to sufficiently form a surface treatment layer containing the organic silane compound, due to the excessively low concentration of the organic silane compound, and fails to offer sufficient bond durability. The concentration of the organic silane compound in the surface treatment solution is preferably 0.01 mass % or more, and more preferably 0.02 mass % or more. In addition, the concentration of the organic silane compound in the surface treatment solution is preferably less than 0.5 mass %, and more preferably less than 0.2 mass %.

In the present invention, the kind of the alkyl silicate or oligomer thereof contained in the surface treatment solution is not particularly limited. A tetraalkyl silicate or an oligomer thereof which does not generate by-products causing corrosion of the coating layer or deterioration of the adhesive resin after the reaction is preferred. Form this viewpoint, tetraalkyl silicates such as tetramethyl orthosilicate, tetraethyl orthosilicate, and tetraisopropyl orthosilicate, or an oligomer thereof, are preferred. Among these, tetraethyl orthosilicate or an oligomer thereof is preferred from the viewpoint of economic efficiency and safety. Examples of polymerization products include oligomers and the like. Here, the surface treatment solution may contain each of different alkyl silicates or oligomers thereof alone or in combination of two or more thereof.

In the present invention, the kind of the organic silane compound contained in the surface treatment solution is not particularly limited. The organosilane compound may contain a silane compound containing a plurality of hydrolyzable trialkoxysilyl groups in a molecule thereof, a hydrolyzed product of the silane compound, or a polymer derived from the silane compound. The silane compound containing a plurality of hydrolyzable trialkoxy groups in a molecule thereof not only forms a dense siloxane bond by self-polymerization, but also has high reactivity with a metal oxide to form a chemically stable bond, and allows the resulting coating layer to have still better humid durability. In addition, the organic silane treatment layer has high solubility mutually with organic compounds such as working oils; press forming oils and other machine oils; and adhesives. The coating layer, even when working oils, press forming oils, and other machine oils are deposited thereon, can mitigate the influence of the oils and plays a role of eliminating or minimizing deterioration in bond durability caused by such oil application. The kind of the silane compound is not particularly limited, but preferably selected from silane compounds containing two hydrolyzable trialkoxysilyl groups in a molecule (bissilane compounds), from the viewpoint of economic efficiency. Non-limiting examples of such bissilane compounds for use herein include bis(trialkoxysilyl)ethanes, bis(trialkoxysilyl)benzenes, bis(trialkoxysilyl)hexanes, bis(trialkoxysilylpropyl)amines, and bis(trialkoxysilylpropyl)tetrasulfides. In particular, bis(triethoxysilyl)ethane (hereinafter also referred to as BTSE) is preferred from the viewpoints of versatility and economic efficiency. The surface treatment solution may contain each of different organic silane compounds alone or in combination of two or more thereof.

The organic silane compound may contain a silane coupling agent containing a reactive functional group capable of chemically bonding with an organic resin component, a hydrolyzed product of the silane coupling agent, or a polymer derived from the silane coupling agent. For example, the use of a silane coupling agent containing a reactive functional group alone or in combination with the silane compound enables formation of chemical bonds between the coating layer and the resin to offer still better bond durability, where specific examples of the reactive functional group include an amino group, an epoxy group, a methacrylic group, vinyl group, and a mercapto group. The functional group of the silane coupling agent is not limited to those listed above, and a silane coupling agent containing any of various functional groups can be selected and used as appropriate depending on the adhesive resin to be used. Preferred specific examples of the silane coupling agent include 3-aminopropyltrimethoxysilane, 3-aminopropyltriethoxysilane, 3-(N-aminoethyl)-aminopropyltrimethoxysilane, 3-(N-aminoethyl)-aminopropyltriethoxysilane, 3-mercaptopropyltrimethoxysilane, 3-mercaptopropyltriethoxysilane, 3-glycidoxypropyltrimethoxysilane, 3-glycidoxypropyltriethoxysilane, 3-methacryloxypropyltrimethoxysilane, and 3-methacryloxypropyltriethoxysilane. The surface treatment solution may contain each of different silane coupling agents alone or in combination of two or more thereof.

In the present embodiment, when the surface treatment solution contains a particulate inorganic compound having a diameter of 1 nm or more (hereinafter, also simply referred to as "particulate inorganic compound"), there is a possibility that the formed coating layer has a larger thickness and the bond strength and bond durability are deteriorated. Therefore, it is preferable that the surface treatment solution is substantially free of the particulate inorganic compound. The case where "the surface treatment solution is substantially free of a particulate inorganic compound" is not limited to an embodiment in which the particulate inorganic compound is not contained at all, and it is permitted to contain the particulate inorganic compound at an impurity level. Specifically, it is permitted that the particulate inorganic compound is contained in an amount of 0.05 mass % or less based on the total amount of the surface treatment solution. Further, examples of the particulate inorganic compound include a sol of an inorganic oxide such as silica and alumina. The diameter of the particulate inorganic compound indicates the diameter of the solid component after drying of the treatment solution by observation with a transmission electron microscope (TEM), or the diameter measured from the in-liquid particle counter of the diluted treatment solution.

When desired, the surface treatment solution may further include one or more components other than the alkyl silicate or an oligomer thereof and the organic silane compound, such as a stabilizer and an auxiliary. For example, the surface treatment solution may contain, as the stabilizer, an organic compound which is exemplified typically by carboxylic acids having 1 to 4 carbon atoms such as formic acid and acetic acid; and alcohols having 1 to 4 carbon atoms such as methanol and ethanol.

A method for preparing the surface treatment solution is exemplified by, but not limited to, the following preparation method.

Initially, an organic silane compound and a small amount of acetic acid as a catalyst are added to a mixture of water and an alcohol such as ethanol to allow the organic silane compound to be thoroughly hydrolyzed, so as to yield an aqueous organic silane compound solution. Next, an aqueous solution of the alkyl silicate or oligomer thereof is prepared by the similar method, the two solutions are mixed, and the mixture is diluted with water to have a predetermined concentration, thereby preparing a surface treatment solution.

The alkyl silicate or an oligomer thereof is basic and easy to polymerize, and when a basic compound is used as the organic silane compound, the alkyl silicate or an oligomer thereof may be excessive polymerized when mixing the solutions. In order to avoid the excessive polymerization, it is preferable to prepare a solution after neutralizing the organic silane solution with acetic acid or the like in advance.

The surface treatment solution according to the present invention is not limited in its use, but is advantageously usable for providing better bond durability of various metal materials bearing an oxide layer, e.g. materials of metals such as aluminum, copper, iron and steels, and titanium. In particular, the surface treatment solution according to the present invention is advantageously usable for allowing an aluminum alloy to have better bond durability.

The aluminum alloy for use herein is not limited in its kind and may be selected as appropriate depending on the intended use of the member into which the aluminum alloy materials processed, and may be selected from various non-heat-treatment or heat-treatment type aluminum alloys prescribed in, or according approximately to, JIS standards. Specific examples of the non-heat-treatment type aluminum alloys include pure aluminum (1000-series), Al—Mn alloys (3000-series) Al—Si alloys (4000-series), and Al—Mg alloys (5000-series). Specific examples of the heat-treatment type aluminum alloys include Al—Cu—Mg alloys (2000-series), Al—Mg—Si alloys (6000-series), and Al—Zn—Mg alloys (7000-series).

For example, in the case where an aluminum alloy material treated with the surface treatment solution according to the present invention is used for an automobile member, the aluminum alloy material preferably has a 0.2% yield strength of 100 MPa or more, from the viewpoint of providing sufficient strength. Specific examples of aluminum alloys that can form aluminum alloy materials satisfactorily having such a property include those containing a relatively large amount of magnesium, such as 2000-series, 5000-series, 6000-series, and 7000-series aluminum alloys. These alloys may be subjected to heat treatment (temper) as needed. Of such various aluminum alloys, 6000-series aluminum alloys are preferably employed, because these aluminum alloys have excellent age hardenability, require relatively smaller amounts of alloy elements, give scrap capable of being recycled with good recyclability, and have excellent formability.

The aluminum alloy to be treated with the surface treatment solution according to the present invention is preferably an aluminum alloy having an oxide layer in at least a part of the surface thereof, where the oxide layer contains Mg in a content of 0.1 atom % or more and less than 30 atom % and has a Cu content controlled to less than 0.6 atom %.

Such aluminum alloy generally contains magnesium as an alloy element. When the oxide layer, which is a complex oxide of aluminum and magnesium, is formed on the surface of the aluminum alloy, a magnesium oxide layer is present as enriched in the surface. The work as intact in this state has such an excessively thick magnesium oxide layer and causes the surface treatment layer to contain a large amount of magnesium, even when the work undergoes the treatment with the surface treatment solution according to the present invention. The resulting surface treatment layer formed in this manner may fail to have sufficient strength as the coating layer itself and may have lower initial adhesiveness.

In addition, the Mg-enriched oxide layer also causes hydration at the interface with the adhesive resin layer and corrosion of the substrate in a hot and humid environment under which moisture, oxygen, chloride ions, and any other substances may enter the material. This causes the aluminum alloy after the surface treatment to have lower bond durability. Specifically, the oxide layer, if containing Mg in a content of 30 atom % or more, tends to cause the aluminum alloy after the surface treatment to have lower initial adhesiveness and lower bond durability. Therefore, the oxide layer of the aluminum alloy preferably has an Mg content of less than 30 atom %. This allows the resulting article to have higher initial adhesiveness and better bond durability. The Mg content in the oxide layer of the aluminum alloy is more preferably less than 25 atom %, still more preferably less than 20 atom % and particularly preferably less than 10 atom %, from the viewpoints of providing higher initial adhesiveness and better bond durability. In contrast, the Mg content in the oxide layer of the aluminum alloy is, in terms of a lower limit, preferably 0.1 atom % or more from the viewpoint of economic efficiency.

The presence of excessive Cu in the surface of the oxide layer causes the surface treatment layer to contain an excessive amount of Cu and causes the article to have lower bond durability, where the surface treatment layer is formed by the surface treatment with the surface treatment solution according to the present invention. Therefore, the Cu content in the oxide layer of the aluminum alloy is preferably controlled to less than 0.6 atom %, and more preferably controlled to less than 0.5 atom %.

The Mg content or the Cu content in the oxide layer of the aluminum alloy can be adjusted or controlled by appropriately controlling various conditions in an etching treatment such as acid wash and/or alkali wash, where the conditions are exemplified by treatment time, treatment temperature, and concentration and pH of the agent liquid. The Mg content or the Cu content in the oxide layer of the aluminum alloy can be measured by glow discharge-optical emission spectroscopy (GD-OES).

(Method for Treating Metal Surface)

Next, the method for treating a metal surface with the aqueous solution for metal surface treatment according to the present invention is described.

The method for treating a metal surface with the aqueous solution for metal surface treatment according to the present invention includes applying the aqueous solution for metal surface treatment onto a surface of a metal to form a surface treatment layer so that the surface treatment layer after drying is present in an amount of 0.5 mg/m$^2$ or more and 20 mg/m$^2$ or less. The surface treatment solution may be applied partially or entirely onto the metal surface.

The surface treatment solution may be applied by a technique such as immersion treatment, spraying, roll coating, bar coating, or electrostatic coating. After the surface treatment, raising may be performed or not, but is preferably not performed, for effectively providing satisfactory stability and density of the coating layer. Specific examples of a cleaning liquid for use in rinsing include water, alcohols and the like.

The surface treatment solution after application may be dried by heating as needed. The heating temperature is preferably 70° C. or higher, more preferably 80° C. or higher, and still more preferably 90° C. or higher. The heating temperature is preferably 200° C. or lower, more preferably 190° C. or lower, and still more preferably 180° C. or lower, because heating at an excessively high temperature may affect the properties of the metal. The drying time is preferably 2 seconds or longer, more preferably 5 seconds or longer, and still more preferably 10 seconds or longer, while the drying time may vary depending on the heating temperature. In contrast, the drying time is preferably 20 minutes or shorter, more preferably 5 minutes or shorter, and still more preferably 2 minutes or shorter.

From the viewpoint of sufficiently effectively providing better bond durability, the mass of coating of the surface treatment solution is preferably adjusted so that the coating layer after drying is present in an amount of 1 mg/m$^2$ or more and 15 mg/m$^2$ or less. In addition, the mass of coating of the surface treatment solution is more preferably adjusted so that the coating layer after drying is present in an amount of 1.5 mg/m$^2$ or more and 10 mg/m$^2$ or less. The surface treatment solution, if applied in an excessively small mass of coating, may fail to form a coating layer and fail to provide good bond durability. The surface treatment solution, if applied in an excessively large mass of coating, may form an excessively thick surface treatment layer and may cause the article to suffer from deterioration in bond durability due to peeling or separation inside the surface treatment layer. In addition, assume that such excessively thick surface treatment layer may be subjected typically to a degreasing-etching step for painting after an automobile assembly step, and in this case, the surface treatment layer is hardly removed by the step and may adversely affect paint adhesion.

The metal to be subjected to the treatment with the surface treatment solution according to the present invention is preferably subjected to etching treatment as a pretreatment. This is preferred from the viewpoint of surely providing uniformity in the treatment.

In the etching treatment, at least one of a treatment with an acidic solution (acid wash) and a treatment with an alkaline solution (alkali wash or alkaline degreasing) is performed partially or entirely on the surface of the metal. An agent liquid for use in acid wash (acid wash agent) may be selected from, but not limited to, solutions containing at least one selected from the group consisting of sulfuric acid, nitric acid, and hydrofluoric acid. The acid wash agent may contain a surfactant to offer higher degreasing ability. Conditions for the acid wash can be set as appropriate in consideration of the chemical composition of the metal material or the thickness of the oxide layer, and are not limited. For example, the acid wash may be performed at a pH of 2 or less and a treatment temperature of 10° C. to 80° C. for a treatment time of 1 to 120 seconds.

An agent liquid for use in the alkali wash (alkaline degreasing) is also not limited but may be selected from solutions containing at least one selected from the group consisting of sodium hydroxide and potassium hydroxide. Conditions for the treatment with the alkaline solution can be set as appropriate in consideration of the chemical composition of the metal material or the thickness of the oxide layer, and are not limited. For example, the alkali wash may be performed at a pH of 10 or more and a treatment temperature of 10° C. to 80° C. for a treatment time of 1 to 120 seconds.

After washing with each agent liquid, rinsing is preferably performed. The rinsing may be performed typically, but non-limitingly, by spraying or immersion. Specific examples of a cleaning liquid for use in the rinsing include industrial water, pure water, and ion-exchanged water.

(Bonded Article Including Surface-Treated Metal Article)

The metal article surface-treated with the aqueous solution for metal surface treatment according to the present invention is hereinafter also referred to as a "surface-treated metal article". The surface-treated metal article resists deterioration in bond strength and offers excellent bond durability even when exposed to a hot and humid environment. Here, the surface-treated metal article may be bonded to another member through an adhesive resin to form a bonded article. The category of the other member includes, for example, other surface-treated metal articles, other metal articles without surface treatment, and resin molded articles, and the like.

The adhesive resin is not limited and may be selected from adhesive resins conventionally used for bonding of aluminum alloy materials, such as epoxy resins, urethane resins, nitrile resins, nylon resins, and acrylic resins. The layer of the adhesive resin may have a thickness of preferably, but non-limitingly, 10 µm to 500 µm, and more preferably 50 µm to 400 µm, from the viewpoint of providing higher bond strength.

The other metal articles without surface treatment may be made from metal materials as with the metal materials from which metal articles are made and subjected to a surface treatment.

Specific examples of the resin molded article for use herein include fiber-reinforced plastic molded articles made from various fiber-reinforced plastics, such as glass fiber-reinforced plastics (GFRPs), carbon fiber-reinforced plastics (CFRPs), boron fiber-reinforced plastics (BFRPs), aramid fiber-reinforced plastics (AFRPs, KFRPs), polyethylene fiber-reinforced plastics (such as DFRPs), and ZYLON-reinforced plastics ZFRPs). The use of any of these fiber-reinforced plastic molded articles enables weight reduction of the bonded article while maintaining its strength at certain level.

Other than the fiber-reinforced plastics, the resin molded article may also be made from non-fiber-reinforced engineering plastics such as polypropylenes (PPs), acrylonitrilebutadiene-styrene copolymer (ABS) resins, polyurethanes (PUs), polyethylenes (PEs), poly(vinyl chloride)s (PVCs), nylon 6, nylon 66, polystyrenes (PSs), poly(ethylene terephthalate)s (PETs), polyamides (PAs), poly(phenylene sulfide)s (PPSs), poly(butylene terephthalate)s (PBTs), and polyphthalamides (PPAs).

[Production Method of Bonded Article]

A method, in particular bonding method, for producing the bonded article may employ any conventional or known bonding methods. A layer of the adhesive resin may be formed on the aluminum alloy material typically, but not-limitingly, by using an adhesive sheet previously prepared from the adhesive resin, or by spraying or applying the adhesive resin onto the surface treatment layer.

In the case where the bonded article according to the present embodiment employs an aluminum alloy material including two surface treatment layers as both surface layers thereof (not shown), the bonded article can further include the above-mentioned aluminum alloy material, or another aluminum alloy material not including the surface-treatment layer, or a resin molded article, as bonded through the adhesive resin or a layer of the adhesive resin to the surface treatment layer.

The produced aluminum alloy material may be coated with a machine oil such as a press forming oil before the preparation of the bonded article, or before processing into an automobile member. The press forming oil for use herein is mainly selected from those containing an ester component. The methods and conditions to coat the aluminum alloy material with the press forming oil are not limited, and may be selected from a wide variety of methods and conditions for general coating with a press forming oil. For example, the coating may be performed by immersing the aluminum alloy material in a press forming oil containing ethyl oleate as the ester component. The ester component for use herein is not limited to ethyl oleate, but may also be selected from various ester components such as butyl stearate and sorbitan monostearate.

The bonded article may also be coated with a press forming oil before processing into an automobile member, as with the aluminum alloy material.

EXAMPLES

Hereinafter, the effects of the present invention are concretely described with reference to examples of the present invention and comparative examples. In the examples, metal surfaces were treated, and properties such as bond durability were evaluated by the methods under the conditions as mentioned below.

Example 1

A cold-rolled sheet of an aluminum alloy having a thickness of 1 mm was prepared using a 6000-series aluminum alloy according to JIS 6016 (Mg: 0.54 mass %; Si: 1.11 mass %; and Cu: 0.14 mass %). The cold-rolled sheet was cut to a piece having a length of 100 mm and a width of 25 mm and used as a substrate. The substrate was subjected to a heat treatment up to an attained temperature of the substrate of 550° C., followed by cooling.

Next, the substrate was subjected to alkaline degreasing with an aqueous solution containing potassium hydroxide and having a pH of 13, at 50° C. for 40 seconds, further subjected to acid wash with a solution containing sulfuric acid and hydrofluoric acid and having a pH of 1, at a temperature of 50° C. for a treatment time of 40 seconds, followed by rinsing and drying.

Aside from this, another solution was prepared by mixing 1.0 g of bis(triethoxysilyl)ethane (BTSE) as an organosilane with 2.0 g of ethanol, 0.001 g of acetic acid, and 1 g of water, followed by stirring for one night. Next, the resulting solution was further diluted with water up to 10 mL and an aqueous BTSE solution was yielded. In addition, 1.0 g of tetraethylorthosilicate (TEOS) as a silicate was mixed with 5.0 g of ethanol, 0.001 g of acetic acid and 1 g of water, followed by stirring. Next, the resulting solution was further diluted with water up to 10 mL and an aqueous TEOS solution was yielded. 1 mL of the aqueous BTSE solution and 2 mL of the aqueous TEOS solution were mixed, and the resting mixture was further diluted with water up to 100 mL and a TEOS-BTSE mixed solution (surface treatment solution) was yielded. The resulting surface treatment solution contained the TEOS in a concentration of 0.2 mass % and BTSE in a concentration of 0.1 mass %. In addition, the surface treatment solution had a pH of 5.

Then, 100 μL of surface treatment solution was applied uniformly onto the surface of the substrate using a bar coater, dried by heating at 100° C. for 1 minute, and a surface-treated article was yielded. The coating layer after drying was present in an amount of 5.7 mg/m$^2$.

Next, a press forming oil was diluted with toluene to adjust the concentration, applied onto the surface-treated article, and dried so as to be present in a mass of coating of 1 g/m$^2$ after drying.

Example 2

A surface-treated article in Example 2 was prepared by the procedure same as that in Example 1, except for using a surface treatment solution containing TEOS in a concentration of 0.065 mass % and BTSE in a concentration of 0.025 mass %. The surface treatment solution had a pH of 6.0, and the coating layer after drying was present in an amount of 2.1 mg/m$^2$. Next, a press forming oil was diluted with toluene to adjust the concentration, applied onto the surface-treated article, and dried so as to be present in a mass of coating of 1 g/m$^2$ after drying.

Example 3

A surface-treated article in Example 3 was prepared by the procedure same as that in Example 1, except for using a surface treatment solution containing TEOS in a concentration of 0.325 mass % and BTSE in a concentration of 0.41 mass %. The surface treatment solution had a pH of 4.5, and the coating layer after drying was present in an amount of 10.8 mg/m$^2$. Next, a press forming oil was diluted with toluene to adjust the concentration, applied onto the surface-treated article, and dried so as to be present in a mass of coating of 1 g/m$^2$ after drying.

Example 4

A surface-treated article in Example 4 was prepared by the procedure same as that in Example 1, except for using a surface treatment solution containing TEOS in a concentration of 0.13 mass % and BTSE in a concentration of 0.04 mass %. The surface treatment solution had a pH of 5.5, and the coating layer after drying was present in an amount of 1.1 mg/m$^2$. Next, a press forming oil was diluted with toluene to adjust the concentration, applied onto the surface-treated article, and dried so as to be present in a mass of coating of 1 g/m² after drying.

Example 5

A surface-treated article in Example 5 was prepared by the procedure same as that in Example 1, except for using a surface treatment solution containing TEOS in a concentration of 0.07 mass % and BTSE in a concentration of 0.01 mass %. The surface treatment solution had a pH of 5.5, and the coating layer after drying was present in an amount of 1.4 mg/m². Next, a press forming oil was diluted with toluene to adjust the concentration, applied onto the surface-treated article, and dried so as to be present in a mass of coating of 1 g/m² after drying.

Example 6

A surface-treated article in Example 6 was prepared by the procedure same as that in Example 1, except for using a surface treatment solution containing TEOS in a concentration of 0.2 mass % and BTSE in a concentration of 0.9 mass %. The surface treatment solution had a pH of 4.5, and the coating layer after drying was present in an amount of 16 mg/m². Next, a press forming oil was diluted with toluene to adjust the concentration, applied onto the surface-treated article, and dried so as to be present in a mass of coating of 1 g/m² after drying.

Example 7

A surface-treated article in Example 7 was prepared by the procedure same as that in Example 1, except for using a surface treatment solution containing an TEOS oligomer as a silicate, instead of TEOS, in a concentration of 0.15 mass % and BTSE in a concentration of 0.2 mass %. The surface treatment solution had a pH of 5.0, and the coating layer after drying was present in an amount of 6.5 mg/m². Next, a press forming oil was diluted with toluene to adjust the concentration, applied onto the surface-treated article, and dried so as to be present in a mass of coating of 1 g/m² after drying.

Example 8

A surface-treated article in Example 8 was prepared by the procedure same as that in Example 1, except for using a surface treatment solution containing TEOS in a concentration of 0.05 mass % and bistriethoxysilylbenzene (BTSB), as an organosilane, in a concentration of 0.04 mass %. The surface treatment solution had a pH of 5.0, and the coating layer after drying was present in an amount of 2.1 mg/m². Next, a press forming oil was diluted with toluene to adjust the concentration, applied onto the surface-treated article, and dried so as to be present in a mass of coating of 1 g/m² after drying.

Example 9

A surface-treated article in Example 9 was prepared by the procedure same as that in Example 1, except for using a surface treatment solution containing TEOS in a concentration of 0.009 mass % and aminopropyltriethoxysilane (APS), as an organosilane, in a concentration of 0.015 mass %. The surface treatment solution had a pH of 5.5, and the coating layer after drying was present in an amount of 0.6 mg/m². Next, a press forming oil was diluted with toluene to adjust the concentration, applied onto the surface-treated article, and dried so as to be present in a mass of coating of 1 g/m² after drying.

Example 10

A surface-treated article in Example 10 was prepared by the procedure same as that in Example 1, except for using a surface treatment solution containing TEOS in a concentration of 0.019 mass %, APS as an organosilane in a concentration of 0.005 mass %, and BTSE as an organosilane in a concentration of 0.02 mass %. The surface treatment solution had a pH of 5.5, and the coating layer after drying was present in an amount of 1.1 mg/m². Next, a press forming oil was diluted with toluene to adjust the concentration, applied onto the surface-treated article, and dried so as to be present in a mass of coating of 1 g/m² after drying.

Comparative Example 1

A surface-treated article in Comparative Example 1 was prepared by the procedure same as that in Example 1, except for using a surface treatment solution containing TEOS in a concentration of 0.325 mass % and BTSE in a concentration of 2 mass %. The surface treatment solution had a pH of 4.0, and the coating layer after drying was present in an amount of 28 mg/m². Next, a press forming oil was diluted with toluene to adjust the concentration, applied onto the surface-treated article, and dried so as to be present in a mass of coating of 1 g/m² after drying.

Comparative Example 2

A surface-treated article in Comparative Example 2 was prepared by the procedure same as that in Example 1, except for using a surface treatment solution containing TEOS in a concentration of 0.025 mass % and BTSE in a concentration of 0.004 mass %. The surface treatment solution had a pH of 6.5, and the coating layer after drying was present in an amount of 0.4 mg/m². Next, a press forming oil was diluted with toluene to adjust the concentration, applied onto the surface-treated article, and dried so as to be present in a mass of coating of 1 g/m² after drying.

Comparative Example 3

A surface-treated article in Comparative Example 3 was prepared by the procedure same as that in Example 1, except for using a surface treatment solution containing TEOS in a concentration of 1.5 mass % and BTSE in a concentration of 0.03 mass %. The surface treatment solution had a pH of 5.0, and the coating layer after drying was present in an amount of 21 mg/m². Next, a press forming oil was diluted with toluene to adjust the concentration, applied onto the surface-treated article, and dried so as to be present in a mass of coating of 1 g/m² after drying.

Comparative Example 4

A surface-treated article in Comparative Example 4 was prepared by the procedure same as that in Example 1, except for using a surface treatment solution containing TEOS in a concentration of 0.003 mass % and BTSE in a concentration of 0.1 mass %. The surface treatment solution had a pH of 5.0, and the coating layer after drying was present in an amount of 0.4 mg/m². Next, a press forming oil was diluted with toluene to adjust the concentration, applied onto the surface-treated article, and dried so as to be present in a mass of coating of 1 g/m² after drying.

Comparative Example 5

A surface-treated article in Comparative Example 5 was prepared by the procedure same as that in Example 1, except for using a surface treatment solution containing TEOS as a silicate in a concentration of 0.1 mass %, a silica sol having a diameter of 4 nm, as a silicate, in a concentration of 0.1 mass %, and BTSE in a concentration of 0.1 mass %. The surface treatment solution had a pH of 5.0, and the coating layer after drying was present in an amount of 10.1 mg/m². Next, a press forming oil was diluted with toluene to adjust the concentration, applied onto the surface-treated article, and dried so as to be present in a mass of coating of 1 g/m² after drying.

<Measurement of Amount of Coating Layer>

The amount of the coating layer formed was measured by X-ray fluorescence analysis. Specifically, the silicon content of the coating layer was measured using X-ray fluorescence, and the intensity of the X-ray fluorescence was converted into the mass of coating using a calibration curve. The results are shown in Table 1.

<Cohesive Failure Rate (Bond Durability)>

Figure 1B:
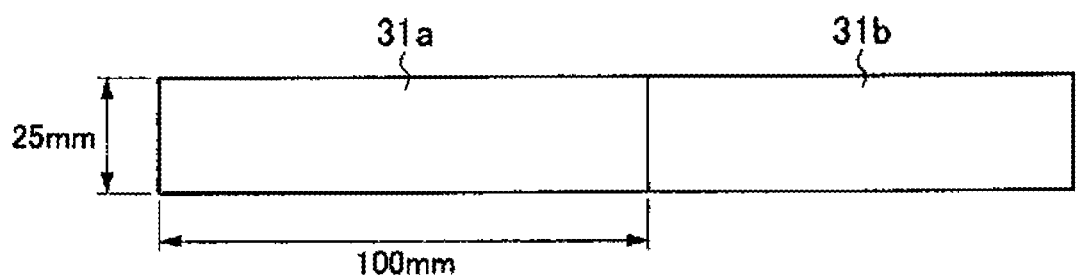
FIG. 1B is a plan view of the bonded test sample and illustrates how to measure the cohesive failure rate.

FIG. 1A and FIG. 1B are a side view and a plan view, respectively, of a bonded test sample and schematically illustrate how to measure a cohesive failure rate. As illustrated in FIGS. 1A and 1B, two test samples 31a and 31b (25 mm wide) having the same configuration were partially overlaid on each other at edges with an overlapping length of 10 mm (adhesive area: 25 mm by 10 mm) and bonded to each other using a thermosetting epoxy resin-containing adhesive resin.

The adhesive resin 35 used herein was a thermosetting epoxy resin-containing adhesive resin (containing a bisphenol-A epoxy resin in a content of 40 mass % to 50 mass %). The adhesive resin 35 was combined with a trace amount of glass beads (having an average particle size of 250 μm) so as to adjust the thickness of the layer of the adhesive resin 35 to 250 μm.

The insulting article was dried at room temperature for 30 minutes after the overlapping, and then heated at 170° C. for 20 minutes to perform thermosetting. The article was then left stand at room temperature for 24 hours and a bonded test sample was yielded.

The prepared bonded test sample was held in a hot and humid environment at a temperature of 50° C. and relative humidity of 95% for 30 days, then pulled using a tensile tester at a speed of 50 mm/min, and the cohesive failure rate of the adhesive resin in the bonded portion was evaluated. The cohesive failure rate was calculated according to the following Mathematical Expression 1. In the following Mathematical Expression 1, one of the two test specimens constituting the bonded test sample after pulling was defined as a test specimen "a", and the other was defined as a test specimen "b".

Cohesive failure rate (%)=100−{(Interfacial peeling area of test specimen"a")/(Bonded area of test specimen"a")×100+(Interfacial peeling area of test specimen"b")/(Bonded area of test specimen"b")×100}  [Mathematical Expression 1]

Three bonded test samples were prepared per each test condition, and the average of three measurement was defined as the cohesive failure rate. According to evaluation criteria, a sample having a cohesive failure rate of less than 60% was evaluated as having poor bond durability (D); a sample having a cohesive failure rate of 60% or more and less than 70% was evaluated as having somewhat good bend durability (C); a sample having a cohesive failure rate of 70% or more and less than 90% was evaluated as having good bond durability (B); and a sample having a cohesive failure rate of 90% or more was evaluated as having excellent bond durability (A). The results are shown in Table 1.

TABLE 1

|  | Surface treatment solution | | | | Amount of coating layer (mg/m²) | Evaluation |
| --- | --- | --- | --- | --- | --- | --- |
|  | Silicate | Concentration (mass %) | Organosilane | Concentration (mass %) | | |
| Example 1 | TEOS | 0.2 | BTSE | 0.1 | 5.7 | A |
| Example 2 | TEOS | 0.065 | BTSE | 0.025 | 2.1 | A |
| Example 3 | TEOS | 0.325 | BTSE | 0.41 | 10.8 | B |
| Example 4 | TEOS | 0.013 | BTSE | 0.04 | 1.1 | B |
| Example 5 | TEOS | 0.07 | BTSE | 0.01 | 1.4 | B |
| Example 6 | TEOS | 0.2 | BTSE | 0.9 | 16 | C |
| Example 7 | TEOS (oligomer) | 0.15 | BTSE | 0.2 | 6.5 | A |
| Example 8 | TEOS | 0.05 | BTSB | 0.04 | 2.1 | A |
| Example 9 | TEOS | 0.009 | APS | 0.015 | 0.6 | B |
| Example 10 | TEOS | 0.019 | APS BTSE | 0.005 0.02 | 1.1 | C |
| Comparative Example 1 | TEOS | 0.32 | BTSE | 2 | 28 | D |
| Comparative Example 2 | TEOS | 0.025 | BTSE | 0.004 | 0.4 | D |
| Comparative Example 3 | TEOS | 1.5 | BTSE | 0.03 | 21 | D |
| Comparative Example 4 | TEOS | 0.003 | BTSE | 0.1 | 0.4 | D |
| Comparative Example 5 | TEOS Silica sol | 0.1 0.1 | BTSE | 0.1 | 10.1 | D |

The sample according to Comparative Example 1 was treated with the surface treatment solution containing the organic silane compound in a concentration higher than the range specified in the present invention, and offered poor bond durability.

The sample according to Comparative Example 2 was treated with the surface treatment solution containing the organic silane compound in a concentration lower than the range specified in the present invention, and offered poor bond durability.

The sample according to Comparative Example 3 was treated with the surface treatment solution containing the alkyl silicate in a concentration higher than the range specified in the present invention, and offered poor bond durability.

The sample according to Comparative Example 4 was treated with the surface treatment solution containing the alkyl silicate in a concentration lower than the range specified in the present invention, and offered poor bond durability.

The sample according to Comparative Example 5 was treated with the surface treatment solution containing the silica sol having a diameter of 1 nm or more, and offered poor bond durability.

In contrast, the samples according to Examples 1 to 10, which meet the conditions specified in the present invention, offered good bond durability.

While the present invention has been described in detail and with reference to specific embodiments thereof, it will be apparent to one skilled in the art that various changes and modifications can be made therein without departing from the spirit and scope thereof.

This application is based on Japanese Patent Application No. 2016-094925 filed on May 10, 2016, the entire subject matters of which are incorporated herein by reference.

The invention claimed is:

1. An aqueous solution, comprising:
    an alkyl silicate or an oligomer thereof in a concentration of 0.005 mass % or more and less than 1 mass %; and
    an organic silane compound in a concentration of 0.005 mass % or more and less than 1 mass %,
    wherein the aqueous solution has a pH of 2 or more and 7 or less, and
    wherein the organic silane compound comprises a silane compound containing a plurality of hydrolyzable trialkoxysilyl groups in a molecule, a hydrolyzed product of the silane compound, or a polymer derived from the silane compound.

2. The solution of claim 1, wherein the alkyl silicate or oligomer thereof is present in a concentration of 0.01 mass % or more and less than 0.5 mass %.

3. The solution of claim 1, wherein the alkyl silicate or oligomer thereof is present in a concentration of 0.02 mass % or more and less than 0.2 mass %.

4. The solution of claim 1, which is substantially free of a particulate inorganic compound having a diameter of 1 nm or more.

5. The solution of claim 1, wherein the organic silane compound is present in a concentration of 0.01 mass % or more and less than 0.5 mass %.

6. The solution of claim 1, wherein the organic silane compound is present in a concentration of 0.02 mass % or more and less than 0.2 mass %.

7. The solution of claim 1, wherein the pH of the aqueous solution is in a range of from 2 to 6.

8. The solution of claim 1, wherein the organic silane compound comprises the silane compound containing a plurality of hydrolyzable trialkoxysilyl groups in a molecule.

9. The solution of claim 1, further comprising, as a stabilizer, at least one selected from the group consisting of an alcohol having 1 to 4 carbon atoms and a carboxylic acid having 1 to 4 carbon atoms.

10. The solution of claim 1, wherein the organic silane compound comprises a silane coupling agent containing a reactive functional group capable of chemically bonding with an organic resin component, a hydrolyzed product of the silane coupling agent, or a polymer derived from the silane coupling agent.

11. A method for treating a metal surface with the aqueous solution of claim 1, the method comprising:
    applying the aqueous solution onto a surface of a metal to form a surface treatment layer so that the surface treatment layer after drying is present in an amount of 0.5 mg/m$^2$ or more and 20 mg/m$^2$ or less.

12. The method of claim 11, wherein the metal is an aluminum alloy.

13. A bonded article, comprising:
    metal articles treated with the aqueous solution of claim 1; and
    an adhesive resin through which the metal articles bond with each other.

14. A bonded article, comprising:
    a metal article treated with the aqueous solution of claim 1;
    a resin molded article; and
    an adhesive resin through which the metal article and the resin molded article bond with each other.

15. The solution of claim 1, wherein the organic silane compound comprises the hydrolyzed product of the silane compound.

16. The solution of claim 1, wherein the organic silane compound comprises the polymer derived from the silane compound.

17. The solution of claim 1, wherein the silane compound contains two hydrolyzable trialkoxysilyl groups in a molecule.

18. The solution of claim 1, wherein the silane compound contains at least one selected from the group consisting of a bis(trialkoxysilyl)ethane, bis(trialkoxysilyl)benzene, bis(trialkoxysilyl)hexane, bis(trialkoxysilylpropyl)amine, bis(trialkoxysilylpropyl)tetrasulfide, and mixture of two or more of any of these.

19. The solution of claim 1, further comprising:
    an acid consisting of at least one of a carboxylic acid having 1 to 4 carbon atoms, sulfuric acid, nitric acid, or hydrofluoric acid, the solution comprising no further acid.

20. The solution of claim 1, further comprising:
    an acid consisting of at least one of formic acid, acetic acid, sulfuric acid, nitric acid, or hydrofluoric acid, the solution comprising no further acid.

* * * * *